(12) United States Patent
Vignotto et al.

(10) Patent No.: US 6,739,674 B2
(45) Date of Patent: May 25, 2004

(54) FITTING OF A WHEEL ONTO THE HUB OF THE MOTOR VEHICLE

(75) Inventors: Angelo Vignotto, Turin (IT); Carlo Maldera, Giaveno (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 10/290,966

(22) Filed: Nov. 8, 2002

(65) Prior Publication Data

US 2003/0102711 A1 Jun. 5, 2003

(30) Foreign Application Priority Data

Nov. 9, 2001 (IT) ...................................... TO2001A1061

(51) Int. Cl.[7] ............................................... B60B 30/06
(52) U.S. Cl. ............................... 301/35.627; 301/35.621
(58) Field of Search ....................... 301/35.621, 35.627; 403/13

(56) References Cited

U.S. PATENT DOCUMENTS

| | | | | |
|---|---|---|---|---|
| 1,405,647 A | * | 2/1922 | Williams | ............... 301/63.109 |
| 4,699,431 A | * | 10/1987 | Daberkoe | ....................... 301/1 |
| 5,692,811 A | * | 12/1997 | Rogers | ..................... 301/105.1 |

* cited by examiner

*Primary Examiner*—Russell D. Stormer
(74) *Attorney, Agent, or Firm*—Merchant & Gould, P.C.

(57) ABSTRACT

For the purpose of facilitating correct fitting of a motor vehicle wheel onto a hub (10) which froms a central axial tubular projection (11) for insertion into a central wheel hole (30), a hub assembly includes an annular cylindrical element (20) to be fitted on the projection (11) and having a plurality of circumferentially spaced resilient portions (21) capable of exerting force in radially outward directions on the wheel hole to support the wheel resiliently in an essentially centered manner relative to the hub.

10 Claims, 3 Drawing Sheets

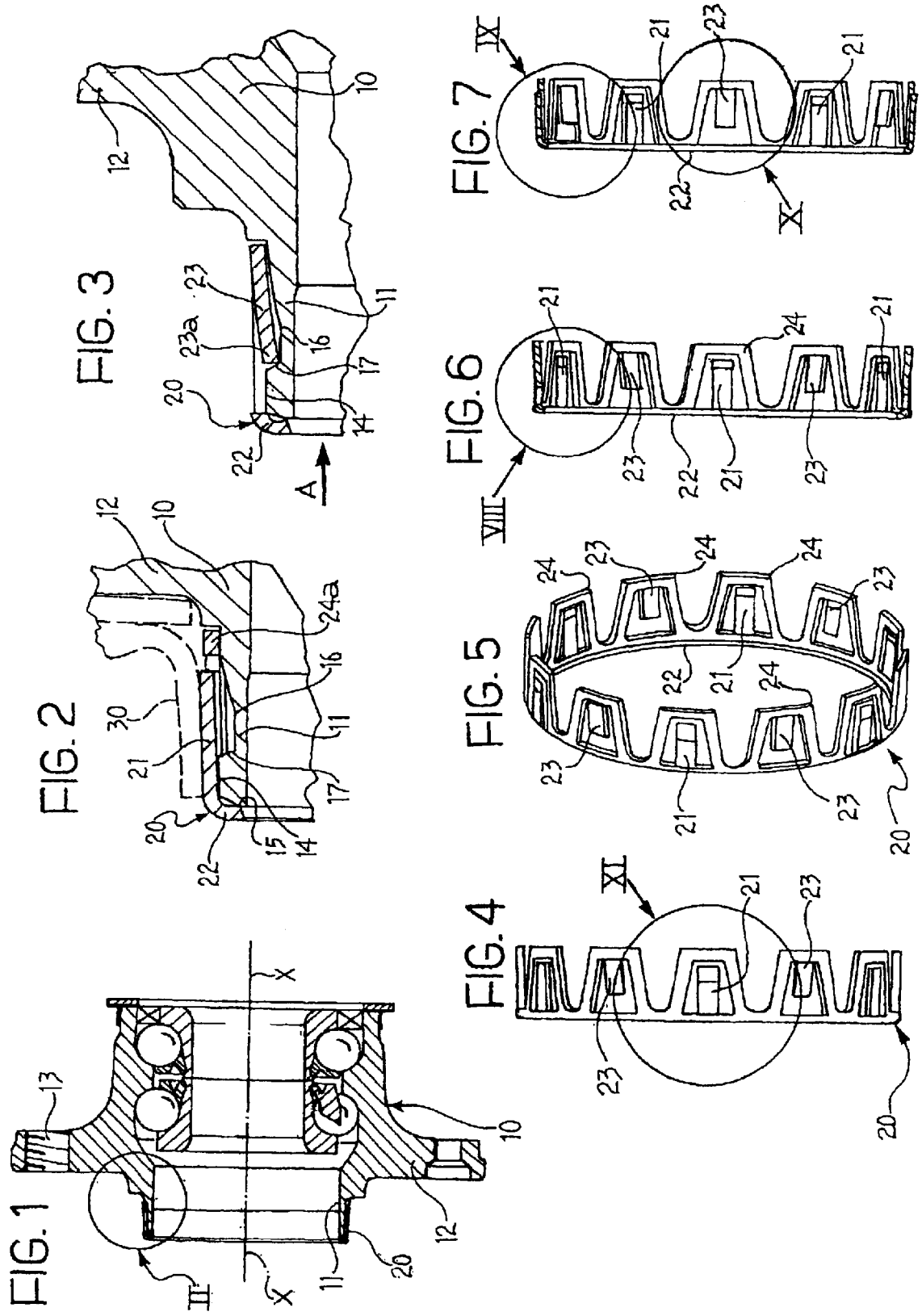

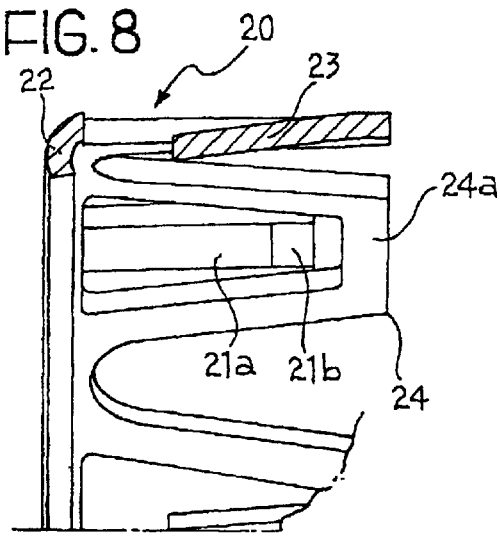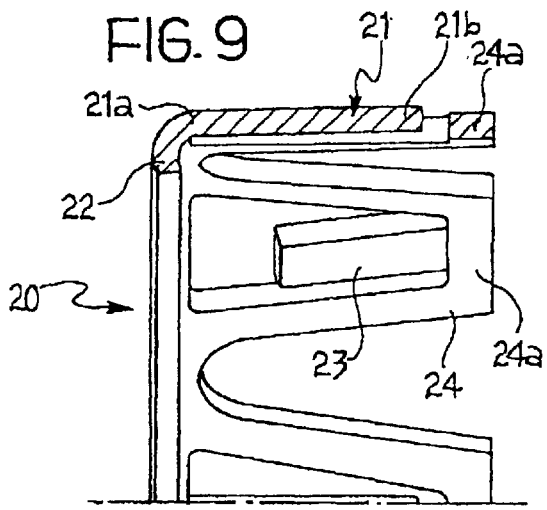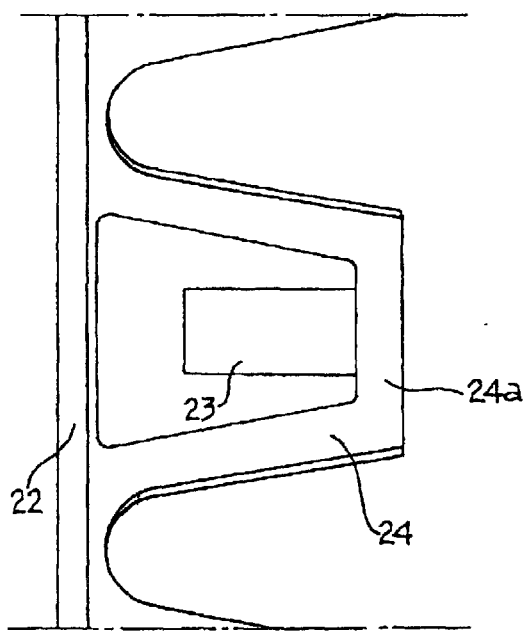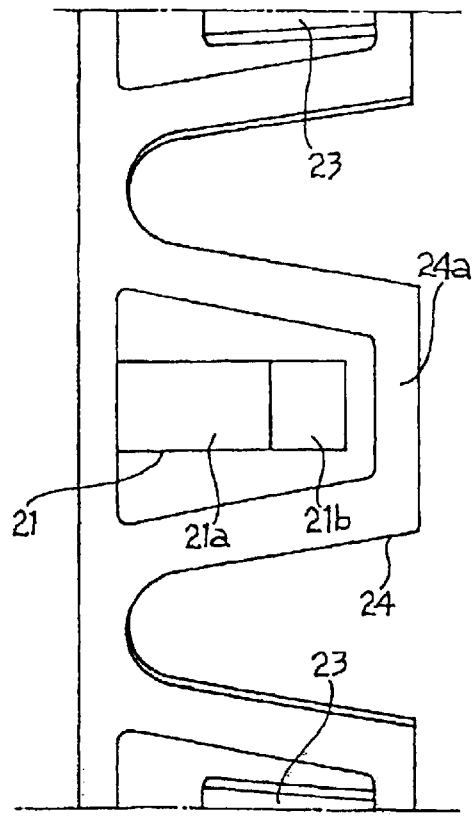

FITTING OF A WHEEL ONTO THE HUB OF THE MOTOR VEHICLE

The present invention relates in general to the fitting of a wheel onto the hub of a motor vehicle. More particularly, the invention relates to a hub assembly for the wheel of a motor vehicle, of the type comprising a hub which forms a central, axial, tubular projection for insertion into a central wheel hole. The invention furthermore relates to a wheel assembly with a hub of the above-stated type.

Motor vehicle wheel hubs are known which have a central tubular projection exhibiting a cylindrical surface onto which the wheel is placed in order to center it in a preliminary phase of fitting onto the hub. The hub usually also exhibits a radial flange with axial holes into which the wheel fastening bolts are driven or otherwise fastened.

The wheel is fitted onto the hub by placing the central wheel hole over the tubular projection of the hub and passing the bolts projecting from the hub flange through corresponding axial holes in the wheel. The locking nuts are then tightened on the bolts. This tightening ensures final centering of the wheel relative to the hub, leaving a narrow circumferential gap between the cylindrical surface of the hub projection and the central wheel hole.

Motor vehicle manufacturers require to minimize radial play between the central wheel hole and the hub projection so that, with the centering achieved by said projection, the bolts are already sufficiently centered in the respective holes in the wheel, so facilitating tightening of the nuts without requiring the person fitting the wheel to lift it up in order to be able to align it with the bolts.

One general object of the present invention is accordingly to provide, in a simple and economic manner, a hub assembly capable of facilitating wheel fitting operations, whether during vehicle assembly or during the vehicle's service life, for example in the event of a puncture or when the wheel is refitted after replacement of its tire.

A further object of the invention is to facilitate removal of the wheel from the hub, even when rust has formed at the interface between the central wheel hole and the tubular projection of the hub. Rust inevitably tends to form in said interfacial zone due to external contaminants (water, mud) which get into the above-mentioned gap. Since rust makes it difficult to remove the wheel from the hub, motor vehicle manufacturers are now requiring hub suppliers to take steps to eliminate this problem.

Various solutions for avoiding the formation of rust have accordingly been proposed. It has been attempted to avoid the formation of rust by coating the tubular projection of the hub with a layer of anti-corrosion material (applied by painting or electrochemical treatment). This has proved costly because it requires costly and bulky equipment (for cleaning the hubs, applying the anti-corrosion material and drying it) to be added to the hub production lines.

A further object of the invention is accordingly to provide a hub assembly which is not affected by the above-stated rust problem and does not require the costly coating treatments and associated equipment to avoid the formation of rust.

Some preferred embodiments of the invention will now be described purely by way of non-limiting example with reference to the attached drawings, in which:

FIG. 1 is an axial sectional view of a hub assembly according to the present invention;

FIG. 2 is a magnified sectional view of the detail indicated II in FIG. 1;

FIG. 3 is a magnified view similar to FIG. 2, but seen from an axial sectional plane angled relative to the plane of FIG. 2;

FIG. 4 is an elevational side view, on a slightly magnified scale, of a cylindrical annular element according to the invention;

FIG. 5 is a perspective view of the annular element of FIG. 4;

FIGS. 6 and 7 are axial sectional views according to angularly offset sectional planes of the annular element of FIGS. 4 and 5;

FIG. 8 is a magnified sectional view of the detail indicated VIII in FIG. 6;

FIG. 9 is a magnified sectional view of the detail indicated IX in FIG. 7;

Figure 12:
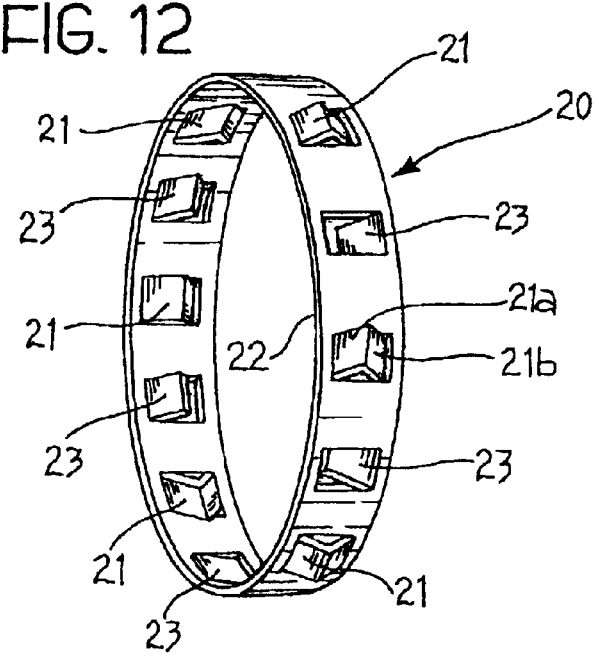
Figure 13:
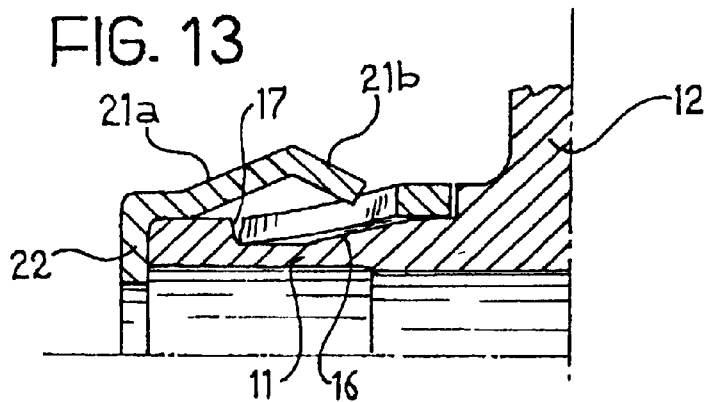
Figure 14:
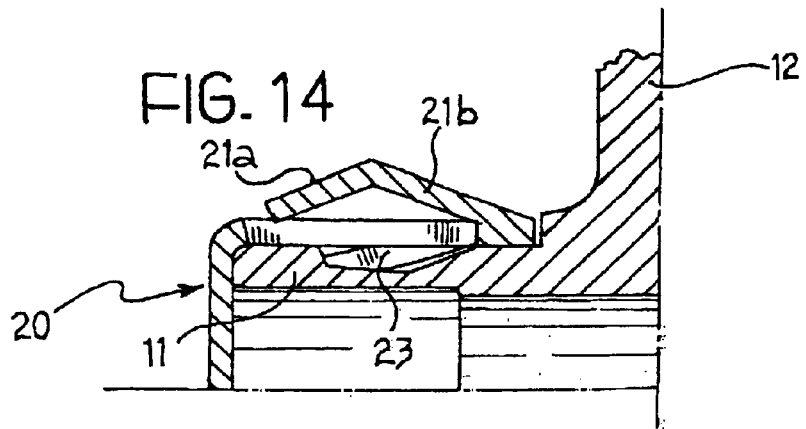

FIG. .10 is a magnified sectional view of the detail indicated X in FIG. 7;

FIG. 11 is a magnified sectional view of the detail indicated XI in FIG. 4;

FIG. 12 is a schematic perspective view of a variant of the annular element of FIG. 4; and FIGS. 13 and 14 are sectional schematic views, similar to FIG. 2, of two further variants of the annular element with which the hub according to the present invention is provided.

With initial reference to FIG. 1, the number 10 indicates a hub for a motor vehicle wheel. In the remainder of the present description, detailed descriptions will be given only of those elements of particular relevance and interest for the purposes of performing the present invention.

The hub 10 exhibits a central tubular centering structure 11 which projects axially towards the outside of the vehicle and a flange 12 which projects radially. Throughout the present description and in the claims, unless otherwise stated, any terms and expressions indicating positions and orientations (such as "radial", "axial", "inward", "outward") relate to the axes of rotation x of the hub and to its fitted state on a vehicle.

Axial holes 13 for the wheel fastening bolts (not illustrated) are formed in the flange 12. When a wheel is fitted onto the hub, the tubular projection 11 makes it possible to center the wheel 30 (illustrated in part in dashed lines in FIG. 2) relative to the hub, supporting it in a position in which the wheel holes are substantially aligned with the fastening bolts and with the holes 13 in the flange 12.

According to the invention, there is fitted on the tubular projection 11 an essentially annular cylindrical metallic element and indicated overall 20, which element resiliently supports the wheel during fitting in order to maintain it in a correctly centered position on the hub. In this manner, it is possible to align the holes in the wheel precisely with the fastening bolts and to tighten the locking nuts easily. As is known, such tightening effects final centering of the wheel relative to the hub.

The annular element 20 forms a first series of circumferentially equidistant resilient tongue portions 21 which project in radially outward directions relative to the outer cylindrical surface 14 of the tubular projection 11. As illustrated schematically in FIG. 2, when a wheel 30 is fitted onto the hub, the central wheel hole is placed around the tongues 21. In the undeformed or free state, before the wheel is fitted, the resilient tongues 21 taken together exhibit a maximum radial dimension which is greater than the diameter of the central wheel hole 30. Fitting of the wheel forces the tongues 21 to flex resiliently in a radially inward direction. As a result, the resilient tongues 21 act on the surface of the wheel hole, pressing in radially outward directions with a force sufficient to keep the wheel centered relative to the hub and eliminating the radial play between the wheel and the tubular projection 11 of the hub.

The annular element 20 is illustrated separately in FIGS. 4 to 7; the tongues are in a free or undeformed state, before the annular element 20 has been fitted onto the hub and before the wheel has been fitted onto the hub and onto said annular element 20. In the preferred embodiment illustrated in these Figures, the annular element 20 is obtained by punching and folding of metal sheet, preferably spring steel sheet. The number and mechanical properties of the tongues 21 are selected such that a normal motor vehicle wheel, equipped with a tire, is supported in centered manner relative to the hub.

As can be seen better from FIG. 9, when in their undeformed or free state before the wheel 30 is fitted, the tongues 21 exhibit at least the axially more outward portion 21a thereof which is inclined in accordance with a conical surface converging in the axially outward direction of the hub. In the example of FIG. 9, the tongues 21 are folded at an obtuse angle of almost 180° and exhibit an axially more inward portion 21b which is essentially horizontal or oriented according to an axial cylindrical surface. As an alternative to the configuration with an obtuse angle illustrated in FIG. 9, the resilient tongues 21 may be straight, but are preferably inclined in accordance with a conical surface, as for the axially more outward portions 21a illustrated in FIG. 9.

As illustrated more clearly in FIGS. 2 and 9, the resilient tongues 21 extend from a radial edge 22 capable, in the installed state, of abutting the axially outward side 15 of the tubular projection 11.

With reference to FIG. 3, the annular element 20 preferably also forms a second plurality of resilient tongue portions 23 offset angularly with respect to the first resilient tongues 21. The resilient tongues 23 serve to lock or at least retain the annular element 20 on the hub. The locking tongues 23 are oriented in accordance with a slightly conical surface which converges towards the axially outward side of the hub, but project in radially inward directions in order to snap into a circumferential recess or groove 16 obtained in the outer cylindrical surface 14 of the tubular projection 11.

As illustrated more clearly in FIGS. 4 to 7, the annular element 20 exhibits an overall crown shape with a series of axial teeth 24, from which are obtained by punching the two alternating series of resilient tongues 21 for supporting the wheel and 23 for locking it onto the hub. The tongues 23 extend from axially inward circumferential segments 24a of the teeth 24. Thanks to this configuration, the resilient structure of the teeth 24 helps to increase the resilient action of the tongues 23.

As an alternative to the embodiment illustrated in FIGS. 4–7, it is of course possible to obtain the series of tongues 21, 23 from a differently shaped annular element, for example without forming the teeth 24, but simply by obtaining the resilient tongues by punching and folding from a cylindrical annular element, as illustrated schematically in FIG. 12.

The annular element 20 of the present invention is fitted in an extremely simple manner: once the annular element 20 has been placed upon the tubular projection 11 of the hub, the element 20 is pressed in an axially inward direction as indicated by the arrow A in FIG. 3. As illustrated in FIG. 3, on completion of the pushing movement, when the edge 22 abuts the outward side or surface 15 of the hub, the locking tongues 23 snap resiliently into the recess 16. The axially outward ends 23a of the locking tongues 23, by engaging against the radial shoulder surface 17 of the recess 16, prevent the element 20 from being removed from the hub when the wheel has to be removed, for example to replace the tire.

Since, by resiliently supporting the wheel in a centered position, the resilient tongues 21 eliminate the radial play between the wheel and hub, it is possible thanks to the present invention to reduce, in comparison with the prior art, the level of precision with which the tubular projection 11 is machined and so to save the costs associated with precision machining of said zone.

It will furthermore be appreciated that any possible formation of rust on the tubular projection of the hub will not obstruct removal of the wheel from the hub, since the wheel is supported resiliently by the tongues 21 of the annular element 20.

Persons skilled in the art will recognize that, in an alternative embodiment of the invention, it would also be possible to force the annular element onto the tubular projection 11 of the hub to achieve a radial interference fit instead of providing the resilient locking tongues 23. However, force fitting is a less preferable solution since it involves precision machining for both the projection 11 and the element 20.

According to further alternative embodiments of the invention (not illustrated), the annular element 20 may be fixed onto the hub by means of welding or adhesive bonding.

In all the embodiments of the present invention, it is preferable, with the aim of facilitating insertion of the wheel over the annular element 20, for the resilient tongues 21, when in the undeformed state before the wheel is fitted, to be oriented in accordance with a slightly conical surface which converges towards the axially outward side of the hub (with reference to the fitted state on the hub). In FIG. 13, which for purely illustrative purposes is not to scale, the conicity (converging in an axially outward direction) of the "outboard" portion 21a of the resilient tongues 21, which in this example are folded to form an obtuse angle, has been exaggerated. FIG. 14 is a schematic representation of another variant in which the resilient tongues 21 are folded to an obtuse angle in a similar manner to the tongues of FIG. 13, but in this example the conically outwardly converging portions 21a constitute the free ends of the tongues 21 and the opposite ends extend from a circumferential portion 24a of the annular element 20.

The invention can equally well be applied to the hubs of driving or non-driving wheels, irrespective of the type of bearing associated with hub.

It is understood that the invention is not restricted to the embodiments described and illustrated herein, which should be taken purely as examples; the invention may, however, be modified with regard to the shape and arrangement of parts, structural details and operation. For example, the element 20, which in the description and claims is defined as "an essentially cylindrical annular" element, may alternatively be differently shaped, for example as a cylindrical cover in which the edge 22 extends radially to form a closed radial wall instead of defining an opening.

What is claimed is:

1. A hub assembly for a wheel of a motor vehicle, comprising:

a hub which forms a central, axial, tubular projection for insertion into a central hole of a wheel; and an essentially cylindrical annular element fitted onto the projection and having a plurality of circumferentially spaced resilient portions capable of exerting force in radially outward directions onto the wheel hole to support the wheel resiliently in an essentially centered state relative to the hub, and having a plurality of rapid snap connection means capable of engaging in at least one seat or connection means provided on the hub to retain the annular element on the hub.

2. The hub assembly of claim 1, wherein, in the undeformed or free state, before the wheel is fitted, the resilient portions of the element taken together exhibit a maximum radial dimension which is greater than a diameter of the central wheel hole.

3. The hub assembly of claim 1, wherein, in the undeformed or free state before the wheel is fitted, the resilient portions exhibit at least one axially more outward portion inclined in accordance with a conical surface converging in an axially outward direction of the hub.

4. The hub assembly of claim 1, wherein said rapid connection means comprise a plurality of resilient inclined retaining tongue portions which project in radially inward directions.

5. The hub assembly of claim 4, wherein said resilient retaining tongue portions and said resilient portions for supporting the wheel are formed alternately around the element.

6. The hub assembly of claim 4, wherein said resilient retaining tongue portions extend from end portions of resilient teeth formed integrally with the annular element.

7. The hub assembly of claim 1, wherein said seat or connection means comprises a circumferential recess formed in the outer cylindrical surface of the tubular projection.

8. The hub assembly of claim 1, wherein said seat or connection means comprises an essentially radial shoulder surface formed in an outer cylindrical surface of the tubular projection.

9. A wheel and hub assembly for a wheel of a motor vehicle comprising:

a wheel with a central hole;

a hub which forms a central axial tubular projection for insertion into said central wheel hole; and an essentially annular cylindrical element fitted on the projection having a plurality of circumferentially spaced resilient portions capable of exerting force in radially outward directions on the wheel hole to support the wheel resiliently in an essentially centered manner relative to the hub, and having a plurality of rapid snap connection means capable of engaging in at least one seat or connection means provided on the hub to retain the annular element on the hub.

10. An essentially annular element to be fitted on a central axial tubular projection of a hub for insertion into a central hole of a wheel, the annular element comprising:

a plurality of circumferentially spaced resilient portions capable of exerting force in radially outward directions on the wheel hole to support the wheel resiliently in an essentially centered condition relative to the hub; and a plurality of rapid snap connection means capable of engaging in at least one seat or connection means provided on the hub to retain the annular element on the hub.

* * * * *